United States Patent
Ueda et al.

(10) Patent No.: US 10,186,694 B2
(45) Date of Patent: Jan. 22, 2019

(54) POWER STORAGE MODULE

(71) Applicant: KABUSHIKI KAISHA TOYOTA JIDOSHOKKI, Kariya-shi, Aichi (JP)

(72) Inventors: Hiromi Ueda, Kariya (JP); Naoto Morisaku, Kariya (JP); Takayuki Kato, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 15/512,406

(22) PCT Filed: Aug. 18, 2015

(86) PCT No.: PCT/JP2015/073162
§ 371 (c)(1),
(2) Date: Mar. 17, 2017

(87) PCT Pub. No.: WO2016/047318
PCT Pub. Date: Mar. 31, 2016

(65) Prior Publication Data
US 2017/0279094 A1    Sep. 28, 2017

(30) Foreign Application Priority Data
Sep. 22, 2014    (JP) .................................. 2014-192705

(51) Int. Cl.
*H01M 2/00*    (2006.01)
*H01M 2/10*    (2006.01)
(Continued)

(52) U.S. Cl.
CPC ........... *H01M 2/1016* (2013.01); *H01M 2/10* (2013.01); *H01M 2/1061* (2013.01);
(Continued)

(58) Field of Classification Search
CPC . H01M 2/1016; H01M 10/486; H01M 10/482
See application file for complete search history.

(56) References Cited

U.S. PATENT DOCUMENTS

| | | | |
|---|---|---|---|
| 2012/0064379 A1 | 3/2012 | Oguri et al. | |
| 2014/0295227 A1* | 10/2014 | Aoki | H01M 2/1016 429/82 |
| 2015/0064541 A1* | 3/2015 | Noh | H01M 2/1061 429/156 |

FOREIGN PATENT DOCUMENTS

| | | |
|---|---|---|
| CN | 102403474 | 4/2012 |
| JP | 2012-64356 | 3/2012 |

(Continued)

OTHER PUBLICATIONS

Translation of International Preliminary Report on Patentability for PCT/JP2015/073162, dated Apr. 6, 2017.

(Continued)

*Primary Examiner* — Cynthia H Kelly
*Assistant Examiner* — Monique M Wills
(74) *Attorney, Agent, or Firm* — Greenblum & Bernstein, P.L.C.

(57) ABSTRACT

A power storage module is provided with: a pair of end plates for clamping a plurality of secondary cells arranged in parallel in one direction; first and second cover members fixed to one end plate of the pair of end plates, the first and second cover members being arranged facing the top surface of an enclosure, an electrode terminal being provided on the top surface; through-holes formed in the first and second cover members, the through-holes extending in the one direction; and engaging protrusions provided to first cell holders, the engaging protrusions protruding in the direction in which the first and second cover members are arranged, (Continued)

and being engaged with the first and second cover members, with the engaging protrusions passed through the through-holes.

11 Claims, 10 Drawing Sheets

(51) Int. Cl.
  *H01M 10/48* (2006.01)
  *H01M 10/04* (2006.01)
(52) U.S. Cl.
  CPC ..... *H01M 2/1077* (2013.01); *H01M 10/0481* (2013.01); *H01M 10/482* (2013.01); *H01M 10/486* (2013.01)

(56) References Cited

FOREIGN PATENT DOCUMENTS

| | | |
|---|---|---|
| JP | 2012-160347 | 8/2012 |
| JP | 2012-243534 | 12/2012 |
| JP | 2013-84444 | 5/2013 |
| WO | 2012/147150 | 11/2012 |
| WO | 2014/119722 | 8/2014 |
| WO | 2015/033795 | 3/2015 |

OTHER PUBLICATIONS

Translation of Written Opinion of International Searching Authority for PCT/JP2015/073162, dated Nov. 24, 2015.

\* cited by examiner

Fig.4
(A)
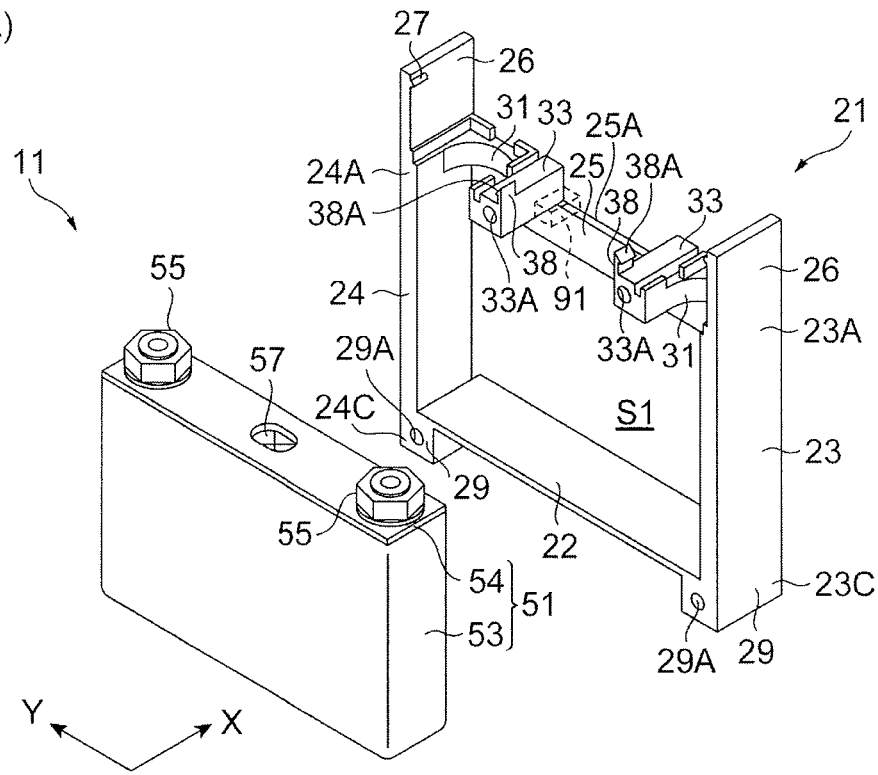
(B)
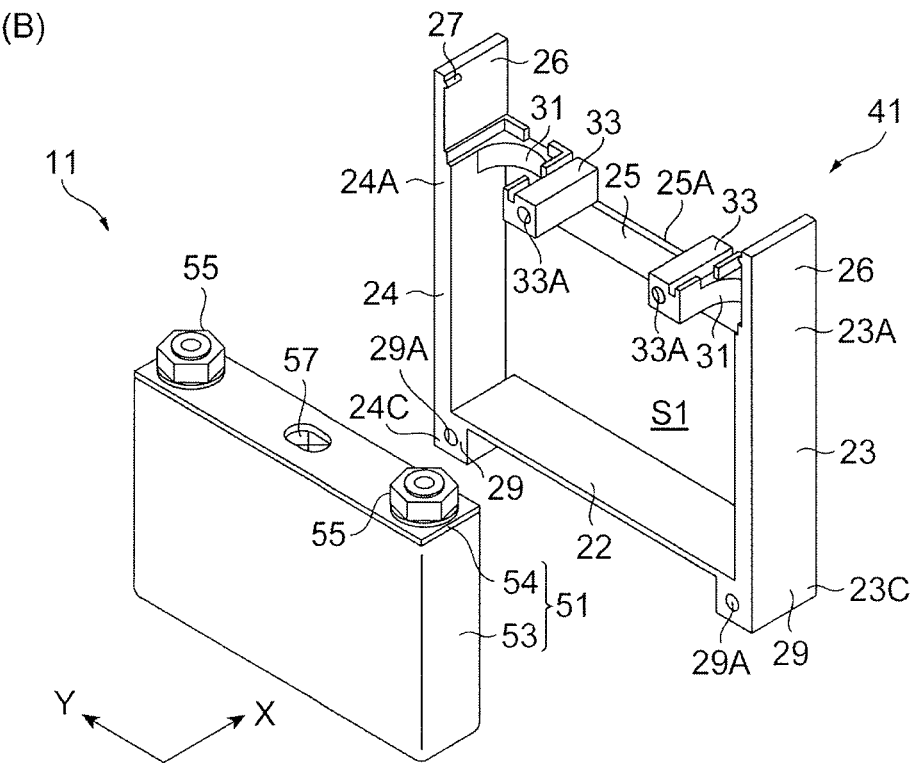

POWER STORAGE MODULE

TECHNICAL FIELD

The present invention relates to a power storage module.

BACKGROUND ART

Conventionally known is a power storage module in which a plurality of power storage devices are serially connected. As an example of such a power storage module, Patent Document 1 discloses a power storage module (battery stack structure) in which power storage devices (battery cells) are disposed serially in one direction, and are connected by a bind bar extending in the direction in which the power storage devices are serially disposed.

CITATION LIST

Patent Literature

Patent Document 1: Japanese Unexamined Patent Publication No. 2012-243534

SUMMARY OF INVENTION

Technical Problem

In such power storage devices, the power storage devices sometimes expand, as the power storage devices are charged and discharged repeatedly, or become deteriorated. There are also situations that it is desirable for such a power storage module to be attached with a cover member for covering the top surface of the electrode terminals, and extending in the direction in which the power storage devices are serially arranged. When the cover member is fixed to the power storage devices, however, the fixing portion may fail to tolerate the expansion force, and become damaged.

To address this issue, an object of the present invention is to provide a power storage module in which damages of a cover member fixed to power storage devices are suppressed, even when the power storage devices expand.

Solution to Problem

In a power storage module according to one aspect of the present invention in which a plurality of power storage devices, each including an electrode assembly having a positive electrode and a negative electrode and housed in an enclosure, are serially arranged in one direction, with holding members holding the respective power storage devices, the power storage module includes a pair of clamping portions configured to clamp the power storage devices that are serially arranged in the one direction; a cover member fixed to one of the pair of clamping portions, and positioned in a manner facing a surface provided with electrode terminals in the enclosure; a long hole provided to the cover member and extending in the one direction; and a fixing portion provided to the holding member, protruding in a direction from which the cover member is placed, and configured to be engaged with the cover member, with the fixing portion passed through the hole.

With the power storage module having such a structure, the hole through which the fixing portion is passed extends in the one direction, in other words, in the direction of the expansion. In this manner, even when the fixing portion of the holding member moves in the direction of the expansion due to the expansion of the power storage devices, the fixing portion can move inside of the hole so that the movement in the direction of the expansion is not restricted. As a result, even when the power storage devices expand, damages of the cover member fixed to the power storage devices can be suppressed.

In the power storage module according to one embodiment, an elastic body may be disposed at least one of between the adjacent power storage devices, and between the power storage device and one of the clamping portions.

With the power storage module having such a structure, even when the power storage devices expand as the power storage devices are charged and discharged repeatedly, or becomes deteriorated, the elastic body can absorb the expansion of the power storage device, by elastically deforming.

According to one embodiment, the power storage module may further include a middle clamping portion disposed between the pair of clamping portions, and disposed on the one clamping portion via the elastic body, in which the other clamping portion and the middle clamping portion may be disposed at respective both ends of the power storage devices that are serially arranged in the one direction.

In the power storage module having such a structure, because the power storage devices become displaced equally in the one direction when the power storage devices expand, an appropriate length of the hole in the one direction can be set easily.

According to one embodiment, the hole provided to the cover member may have a length in the one direction set correspondingly to a distance from a portion fixed to the clamping portion or to the middle clamping portion.

With the power storage module having such a structure, the length, in the one direction, of the hole provided to the cover member is set correspondingly to the amount by which the power storage devices expand, that is, the amount by which the fixing portion of the holding member moves. In this manner, restriction in the movement of the fixing member can be suppressed more reliably, even when the fixing portion moves due to the expansion of the power storage devices. Furthermore, the minimum length of the hole in the one direction can be set correspondingly to the amount of expansion of the power storage devices, that is, the amount by which the fixing portion of the holding member moves. In this manner, for example, limitations in disposing or providing something on the top surface of the cover member can be removed, so that the power storage module can be designed more freely.

According to one embodiment, the cover member may include a first cover member and a second cover member, and the first cover member may be fixed to one of the clamping portions, and the second cover member may be fixed to the other clamping portion.

With the power storage module having such a structure, damages of the holding member or the fixing portion can be suppressed, even when the cover member has two members.

According to one embodiment, the power storage module may further include a middle cover member disposed between the first cover member and the second cover member in the one direction, and disposed facing the surface provided with the electrode terminals in the enclosures of the power storage devices, and the middle cover member is provided movably relatively to the first cover member and the second cover member that are disposed adjacently to the middle cover member.

In the power storage module having such a structure, the middle cover member is configured to be independently movable with respect to the first cover member and the second cover member fixed to the clamping portion or the middle clamping portion. In this manner, when the power storage devices expand, damages due to the restricted movements can be suppressed.

According to one embodiment, the power storage module may further include a plurality of middle cover members disposed between the first cover member and the second cover member in the one direction, and disposed in a manner facing the surface provided with the electrode terminals in the enclosures of the power storage devices, and one of the middle cover members may be provided movably relatively to the first cover member, the second cover member, and the other middle cover member that is disposed adjacently to the one middle cover member.

In the power storage module having such a structure, one of the middle cover members may be configured to be independently movable with respect to the first cover member, the second cover member, and the other middle cover member that is adjacent to the one middle cover member. In this manner, when the power storage devices expand, damages due to restricted movements can be suppressed.

According to one embodiment, a temperature sensor may be provided to the holding member to which the middle cover member is fixed via the fixing portion, and the holding member provided with the temperature sensor and the middle cover member may be integrally movably fixed.

In the power storage module having such a structure, the middle cover member is configured to be independently movable with respect to the first cover member and the second cover member that is fixed to the clamping portion or the middle clamping portion, and to be integrally movable with the holding member to which the temperature sensor is fixed. In this manner, when the power storage devices expand, the middle cover member moves with the holding member to which the middle cover member is fixed. By providing a control device on the top surface of the middle plate that is fixed to the holding member on which the temperature sensor is provided, a change in the relative position between the temperature sensor and the control device can be suppressed. In this manner, damages of the wires connecting the temperature sensor and the control device can be suppressed.

According to one embodiment, the middle cover member may be provided with a hole corresponding to the length of the fixing portion in the one direction.

In the power storage module having such a structure, the fixing portion of the holding member is passed through the hole on the middle cover member without any gap therebetween. In this manner, when the fixing portion of the holding member moves in the direction of the expansion due to the expansion of the power storage devices, the middle cover member, too, moves integrally with the holding member.

Advantageous Effects of Invention

According to the present invention, damages of the cover member fixed to the power storage devices are suppressed even when the power storage devices expand.

BRIEF DESCRIPTION OF DRAWINGS

FIG. 4(A) is a perspective view illustrating the first cell holder illustrated in FIG. 1, and FIG. 4(B) is a perspective view illustrating the second cell holder.

DESCRIPTION OF EMBODIMENTS

Figure 1:
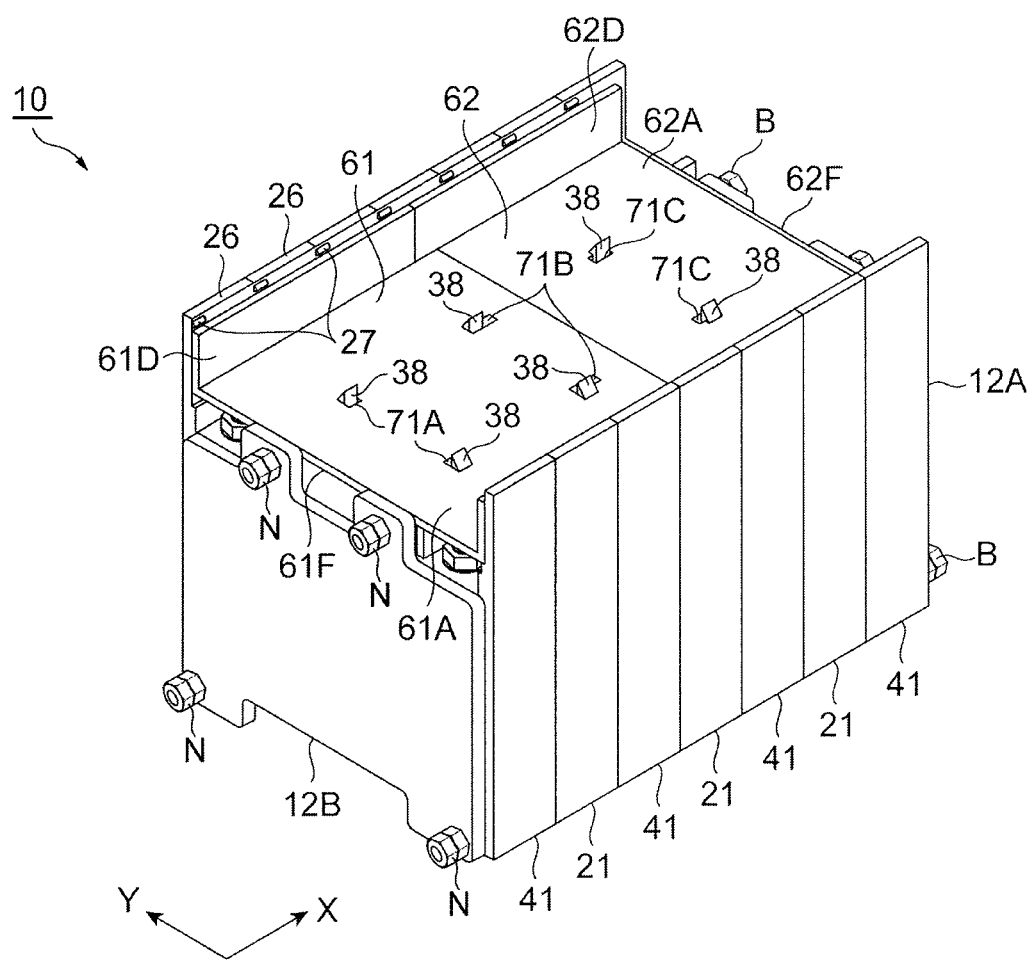
FIG. 1 is a perspective view illustrating the overall structure of a battery module according to one embodiment of the present invention.

One embodiment of the present invention will now be explained with reference to some drawings. In the explanations of the drawings, the same elements are assigned with the same reference signs, and redundant explanations thereof are omitted. The dimensions and their ratios in the drawings do not necessarily match those mentioned in the explanations. Furthermore, in the explanation, the terms indicating directions such as "top" and "bottom" are based on the configuration illustrated in the drawings, and are used merely for convenience sake. An X axis and a Y axis are defined in FIGS. 1, 4(A), 4(B), 6, 7, and 9, also for the convenience of explanation.

Figure 2:
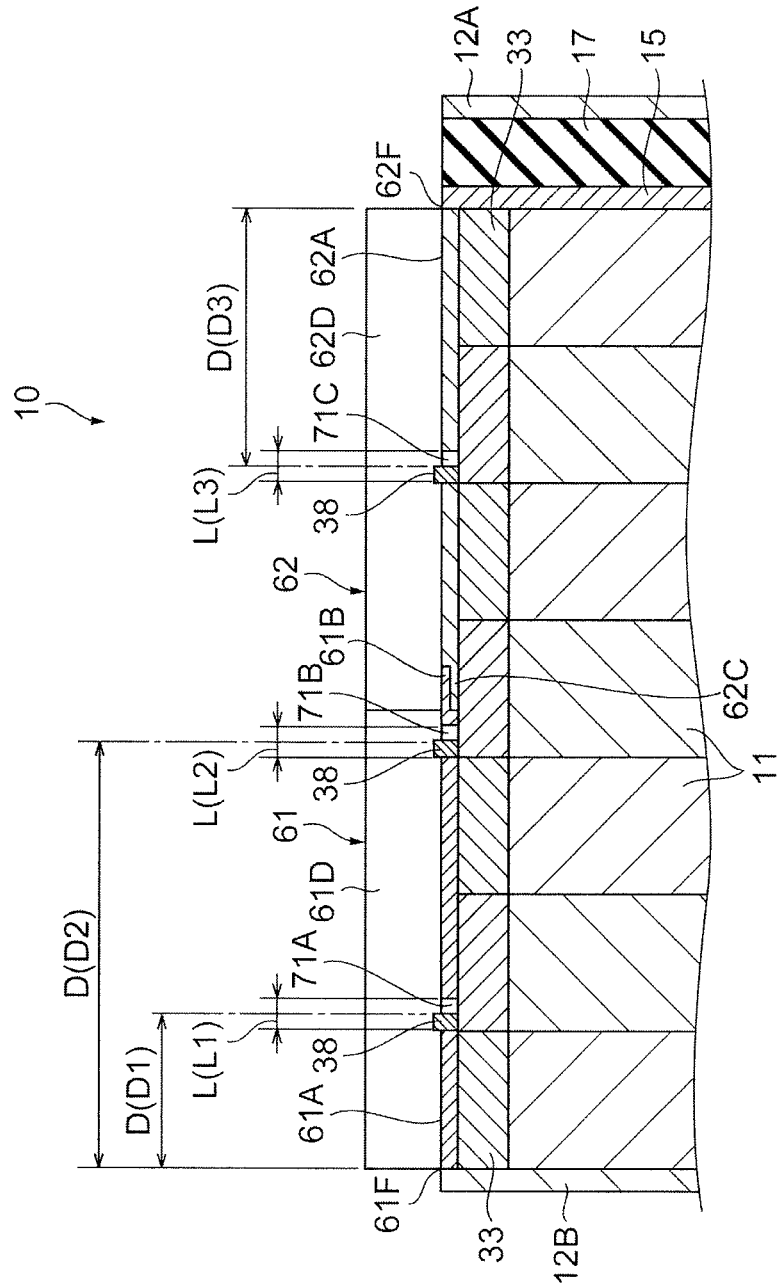
FIG. 2 is a cross-sectional view of the battery module illustrated in FIG. 1 cut in an X-axis direction in a manner passing through every through-hole aligned in the X-axis direction.
Figure 3:
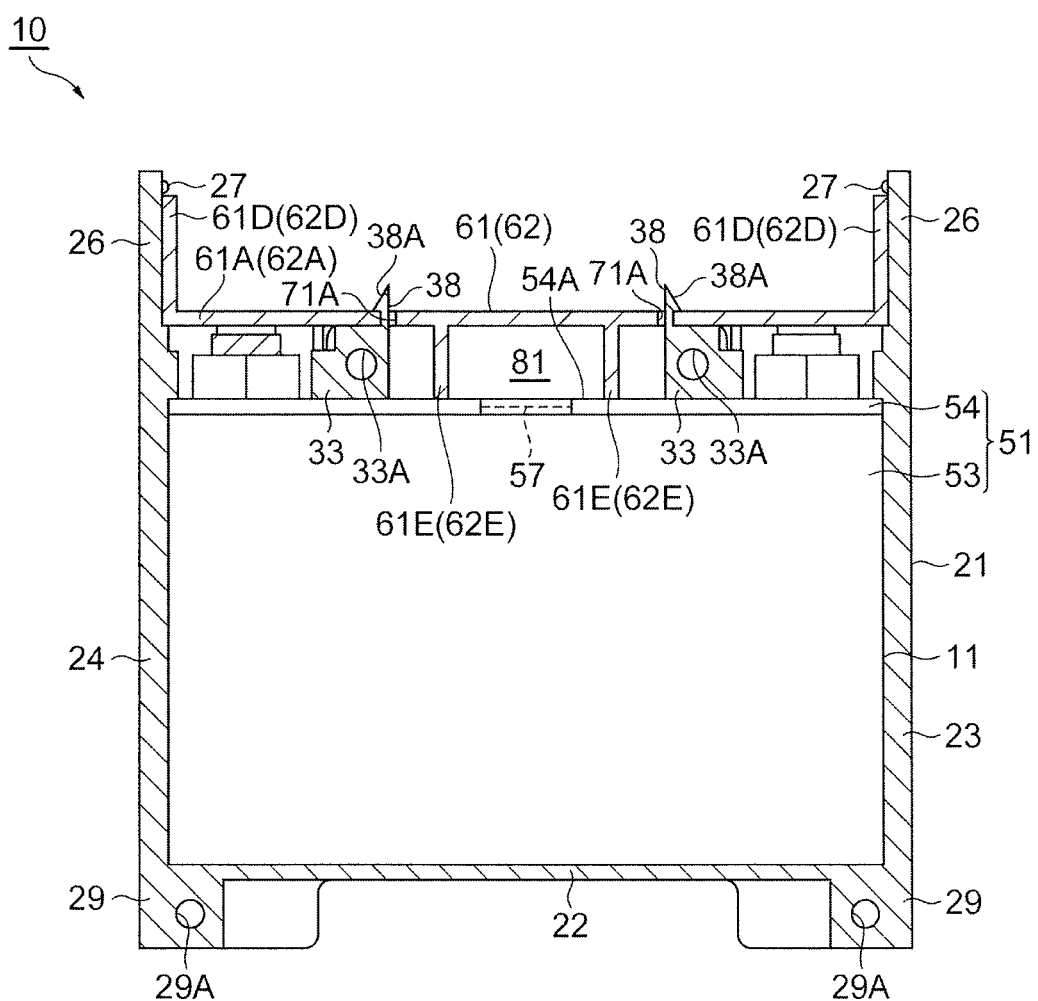
FIG. 3 is a cross-sectional view of the battery module illustrated in FIG. 1 cut across a plane perpendicular to the direction in which secondary cells are serially arranged.

A battery module (power storage module) 10 according to one embodiment will now be explained. As illustrated in FIGS. 1 to 3, the battery module 10 includes a plurality of secondary cells (power storage devices) 11, such as lithium-ion secondary cells or nickel-metal hydride batteries. The secondary cells 11 each held in a first cell holder (holding member) 21 or a second cell holder (holding member) 41 are serially arranged along the X-axis direction (one direction).

A pair of end plates (clamping portions) 12A, 12B are provided on the respective both ends of the battery module 10 in the X-axis direction. Provided on the respective both ends of the secondary cells 11 that are serially arranged in the X-axis direction are the end plate 12B and a middle plate (middle clamping portion) 15. A rubber member (elastic body) 17 is disposed between the middle plate 15 and the end plate 12A.

Bolts B are passed through the pair of end plates 12A, 12B, the middle plate 15, the first cell holders 21, and the second cell holders 41. The bolts B are passed through the one end plate 12A toward the other end plate 12B, and are screwed onto respective nuts N on the side of the other end plate 12B. The pair of end plates 12A, 12B presses and binds the secondary cells 11. The end plates 12A, 12B serves to keep the length of the battery module 10 in the X-axis direction within a constant range.

Figure 5:
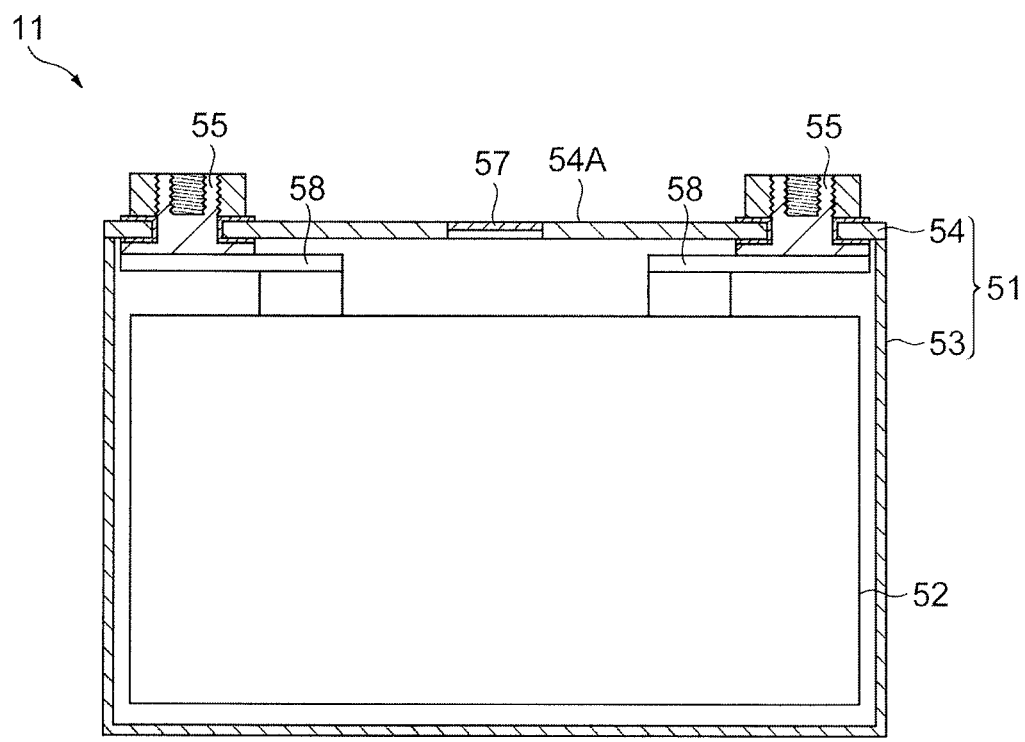
FIG. 5 is a cross-sectional view illustrating the secondary cell included in the battery module in FIG. 1.

Two types of cell holders, the first cell holder 21 and the second cell holder 41, are used in this embodiment. The first cell holders 21 and the second cell holders 41 are arranged alternatingly along one direction (X-axis direction). Hereinafter, the thickness direction of the secondary cells 11, when the secondary cells 11 are held by the first cell holder 21 and the second cell holder 41, (the direction in which the electrode assembly 52 illustrated FIG. 5 is stacked) will be explained as an "X-axis direction", the width direction (the direction along which electrode terminals 55, 55 are aligned) will be explained as a "Y-axis direction", and the direction perpendicular to the thickness direction and the width direction will be explained as a "height direction".

To begin with, the first cell holder 21 will be explained. As illustrated in FIG. 4(A), the first cell holder 21 includes a bottom surface 22 having a rectangular flat-plate shape, a first side surface 23, a second side surface 24, a third side surface 25, feet 29, terminal housings 31, pillar members 33, engaging protrusions 38, and projections 26.

The bottom surface 22 is a part that covers the bottom surface of the secondary cell 11 in a configuration in which the secondary cell 11 is held. The first side surface 23 and the second side surface 24 are positioned at the respective ends of the bottom surface 22 in the Y-axis direction in a manner facing each other, and extend in the height direction. The first side surface 23 and the second side surface 24 are parts that cover the side surfaces of the secondary cell 11 (the surfaces in the direction in which the electrode assembly 52 illustrated in FIG. 5 is stacked) in a configuration in which the secondary cell 11 is held. The third side surface 25 is provided in a manner connecting the first side surface 23 and the second side surface 24 in the thickness direction toward the X-axis direction. A top end 25A of the third side surface 25 is positioned at the same level as the positions 23A, 24A of the top ends of the first side surface 23 and the second side surface 24. The third side surface 25 is a part that covers a part of one of the main surfaces of the secondary cell 11 (the surface perpendicular to the direction in which the electrodes included in the electrode assembly 52 illustrated in FIG. 5 are stacked) in a configuration in which the secondary cell 11 is held.

The respective feet 29, 29 are provided at positions 23C, 24C of the bottom ends of the respective first side surface 23 and the second side surface 24 in the height direction. Each of the feet 29 is provided with a through-hole 29A passed through the corresponding foot 29 in the X-axis direction. The bolt B mentioned above is passed through the through-hole 29A.

The terminal housings 31, 31 are provided to the respective both ends of the top end 25A of the third side surface 25 in the Y-axis direction. The terminal housings 31, 31 are provided in a manner connected with the first side surface 23 and the second side surface 24, respectively. Each of the terminal housings 31 has a U-shaped opening in the X-axis direction. The terminal housings 31 are parts that cover the respective electrode terminals 55 of the secondary cell 11 in a configuration in which the secondary cell 11 is held.

The pillar members 33, 33 are provided adjacently to the terminal housings 31, 31, respectively, on the top end 25A of the third side surface 25. Each of the pillar members 33 is a pillar member having a quadratic prism shape extending in the X-axis direction, and having a length matching the length of the bottom surface 22 in the X-axis direction. Each of the pillar members 33 is provided with a through-hole 33A passed through in the X-axis direction. The bolt B mentioned above is passed through the through-hole 33A.

In the first cell holder 21, the space surrounded by the bottom surface 22, the first side surface 23, the second side surface 24, the third side surface 25, and the pillar members 33 serves as a housing portion S1 in which the secondary cell 11 is housed.

The engaging protrusion 38 is provided to the top end of each of the pillar members 33. The engaging protrusions 38 protrude from the pillar members 33 in a direction opposite to the housing portion S1 in the height direction. An engaging portion 38A having a triangular prism shape is provided at the tip of the engaging protrusion 38.

The projections 26 are provided at the positions 23A, 24A on the top ends of the first side surface 23 and the second side surface 24, respectively. The projections 26 are arranged facing each other, and extend in the height direction. In the projections 26, provided on the surfaces of the projections 26 facing each other are protrusions 27 projecting in the Y-axis direction of the respective projections 26.

The second cell holder 41 will now be explained. As illustrated in FIG. 4(B), the second cell holder 41 has the same structure as the first cell holder 21, except for not being provided with the engaging protrusions 38. Therefore, the parts that are the same as those in the first cell holder 21 are given the same reference signs as those in the first cell holder 21, and explanations thereof will be omitted.

As illustrated in FIG. 5, the electrode assembly 52 included in the secondary cell 11 that is to be held by the first cell holder 21 or the second cell holder 41 described above is housed in an enclosure 51. The electrode assembly 52 has a positive electrode and a negative electrode. The enclosure 51 includes a main body 53 having a shape of a box having a bottom and for housing the electrode assembly 52, and a lid 54 having a plate-like shape for closing the opening of the main body 53. The electrode terminals 55, 55 (the positive electrode terminal and the negative electrode terminal) are provided on the top surface of (surface) 54A of the lid 54. Provided on the top surface 54A of the lid 54 is a release valve 57 that opens to release the internal pressure of the enclosure 51 when the internal pressure of the enclosure 51 increases to a threshold. The "threshold" is set in such a manner that the release valve 57 is caused to open before the enclosure 51 is damaged by the internal pressure of the enclosure 51, when internal pressure of the enclosure 51 increases. The electrode terminal 55, 55 are electrically connected to the electrode assembly 52 via conductive members 58.

As illustrated in FIGS. 1 and 2, the battery module 10 has a first cover member 61 and a second cover member 62 that cover the top surfaces of 54A of the lids 54 of the secondary cells 11 that are serially arranged in the X-axis direction. Mounted on the first cover member 61 and the second cover member 62 are electronic components contributing to charging and discharging of the secondary cells 11, and a battery electronic control unit (ECU) for controlling the battery module 10, for example. The first cover member 61 and the second cover member 62 are cover members made of resin.

As illustrated in FIG. 1, the first cover member 61 and the second cover member 62 are provided side by side in the X-axis direction. One end 61F of the first cover member 61 in the X-axis direction is fixed to the end plate 12B. One end 62F of the second cover member 62 in the X-axis direction is fixed to the middle plate 15.

Figure 6:
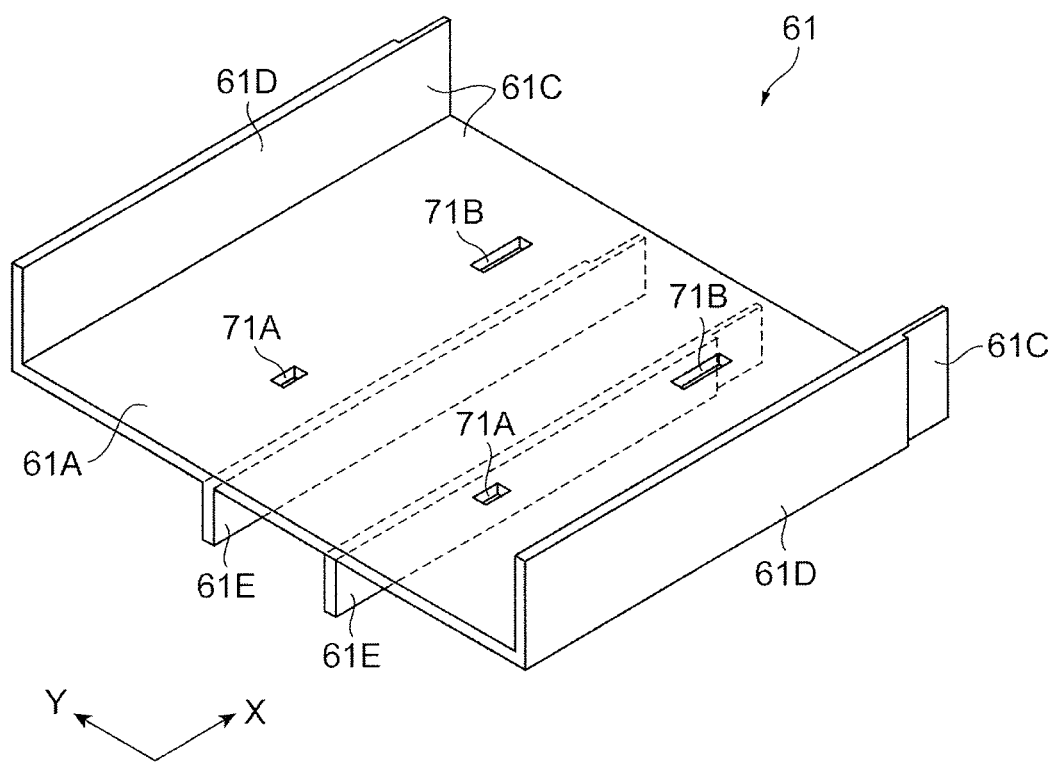
FIG. 6 is a perspective view illustrating a first cover member illustrated in FIG. 1.
Figure 7:
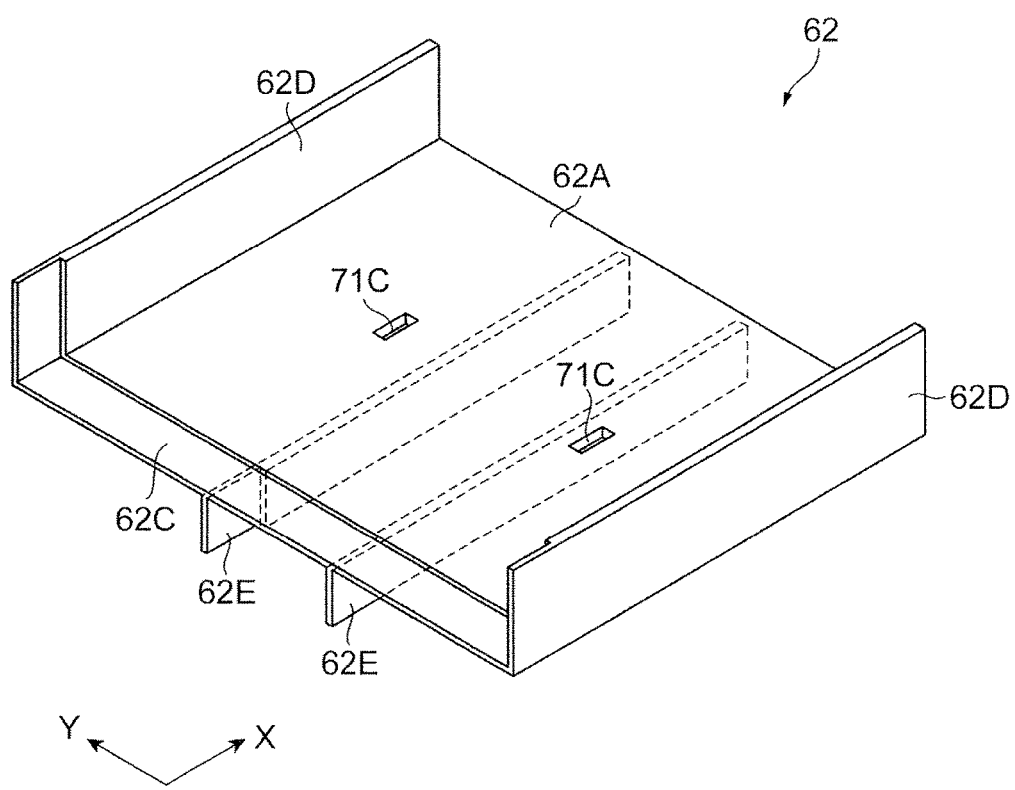
FIG. 7 is a perspective view illustrating a second cover member illustrated in FIG. 1.

As illustrated in FIG. 6, the first cover member 61 has a main body 61A, a pair of standing portions 61D, 61D, and a pair of extending portions 61E, 61E. As illustrated in FIG. 7, the second cover member 62 is structured in the same manner as the first cover member 61, except that the positions of, the number of, and the length in the X-axis direction of the through-holes provided to the main body 62A are different. In this description, the first cover member 61 will be explained in detail.

As illustrated in FIG. 6, the main body 61A is provided in a manner facing the top surfaces of 54A of the lids 54 of the secondary cells 11 (see FIG. 3). The main body 61A has a flat rectangular plate shape. The pair of standing portions 61D, 61D is provided to the respective ends of the main body 61A in the Y-axis direction. The pair of standing portions 61D, 61D stands upwardly in the height direction from the main body 61A, and face each other.

The pair of extending portions 61E, 61E is provided on the surface opposite to the surface provided with the standing portions 61D, 61D in the main body 61A. The pair of extending portions 61E, 61E protrudes downwardly from the main body 61A in the height direction, and are arranged facing each other in such a manner that the release valves 57 of the secondary cells 11 are interposed between the extending portions 61E, 61E (see FIG. 3). The pair of extending portions 61E, 61E extends in the X-axis direction (one direction) of the main body 61A. The pair of extending portions 61E, 61E protrudes from the main body 61A toward the lid 54 of the secondary cells 11, and is brought into contact with the top surface 54A of the lid 54 (see FIG. 3). In other words, the main body 61A is placed on the top surface 54A of the lid 54 via the pair of extending portions 61E, 61E.

As illustrated in FIG. 3, the space that is surrounded by the main body 61A, 62A and the extending portions 61E, 62E of the first cover member 61 and the second cover member 62, and by the top surfaces of 54A of the lids 54, and that extends in the X-axis direction serves as a channel 81 for the gas discharged from the release valves 57. The release valves 57 are exposed to the channel 81. Therefore, when gas is discharged from the release valves 57, the gas is discharged into the channel 81, and circulates through the extending direction of the channel 81. The channel 81 extends up to the end plates 12A, 12B provided to the respective both ends of the direction in which the secondary cells 11 are serially arranged.

As illustrated in FIGS. 6 and 7, an end of the first cover member 61 on the side of the second cover member 62 in the X-axis direction is provided with an overlapping portion 61C, and an end of the second cover member 62 on the side of the first cover member 61 in the X-axis direction is provided with an overlapping portion 62C so that the first cover member 61 and the second cover member 62 can be arranged in an overlapping manner. These overlapping portions 61C, 62C ensure the sealability of the space between the top surface 54A of the lid 54, and the first cover member 61 and the second cover member 62 even when the second cover member 62 moves relatively to the first cover member 61.

As illustrated in FIG. 6, the main body 61A of the first cover member 61 is provided with four through-holes 71A, 71A, 71B, 71B penetrating in the thickness direction of the main body 61A. As illustrated in FIG. 1, the engaging protrusions 38 on the first cell holder 21 are passed through the respective through-holes 71A, 71B. The engaging portions 38A of the engaging protrusions 38 engage with the respective through-holes 71A, 71B, so that the first cover member 61 is fixed to the first cell holder 21 thereby.

As illustrated in FIG. 7, the main body 62A of the second cover member 62 is provided with two through-holes 71C, 71C passed through in the thickness direction of the main body 62A. As illustrated in FIG. 1, the engaging protrusions 38 on the first cell holder 21 are passed through the respective through-holes 71C. In the same manner as the first cover member 61, the engaging portions 38A of the engaging protrusions 38 are engaged with the respective through-holes 71C, so that the second cover member 62 is fixed to the first cell holder 21 thereby.

In this embodiment, as illustrated in FIG. 7, the length L of the through-holes 71A, 71B in the X-axis direction of the first cover member 61 is determined in such a manner that the length L is increased correspondingly to the distance D with respect to the one end 61F (hereinafter also referred to as a "fixing portion 61F") that is a portion where the first cover member 61 and the end plate 12B are fixed. In the same manner, the length L of the through-holes 71C in the X-axis direction of the second cover member 62 is determined in such a manner that the length L is increased correspondingly to the distance D from the one end 62F (hereinafter also referred to as a "fixing portion 62F") that is the portion fixed with the middle plate 15.

Specifically, the distance D from the fixing portion 61F to the through-holes 71A, and from the fixing portion 61F to the through-holes 71B are a distance D1 and a distance D2, respectively. The distance D from the fixing portion 62F to the through-holes 71C is a distance D3. A length relation between the distances D1, D2, and D3 is distance D2>distance D3>distance D1. The lengths L1, L2, and L3 of the respective through-holes 71A, 71B, and 71C in the X-axis direction are determined based on the distances D1, D2, and D3, respectively. In other words, a relation among the lengths L1, L2, and L3 of the respective through-holes 71A, 71B, and 71C in the X-axis direction is length L2>length L3>length L1.

The effects achieved by the battery module 10 according to the embodiment will now be explained. The secondary cells 11 sometimes expand as the secondary cells 11 are charged and discharged repetitively, or become deteriorated. As illustrated in FIGS. 1 and 2, in the battery module 10, the secondary cells 11 are clamped between and bound by the pair of end plates 12A, 12B, with pressure applied thereby, so the entire battery module 10 is prevented from expanding to a level equal to or more than a predetermined level. In the battery module 10 according to the embodiment, because the rubber member 17 is disposed between the pair of end plates 12A, 12B, the expansion of the secondary cells 11 at the level of the predetermined level is absorbed by the rubber member 17, as illustrated in FIG. 8.

Figure 8:
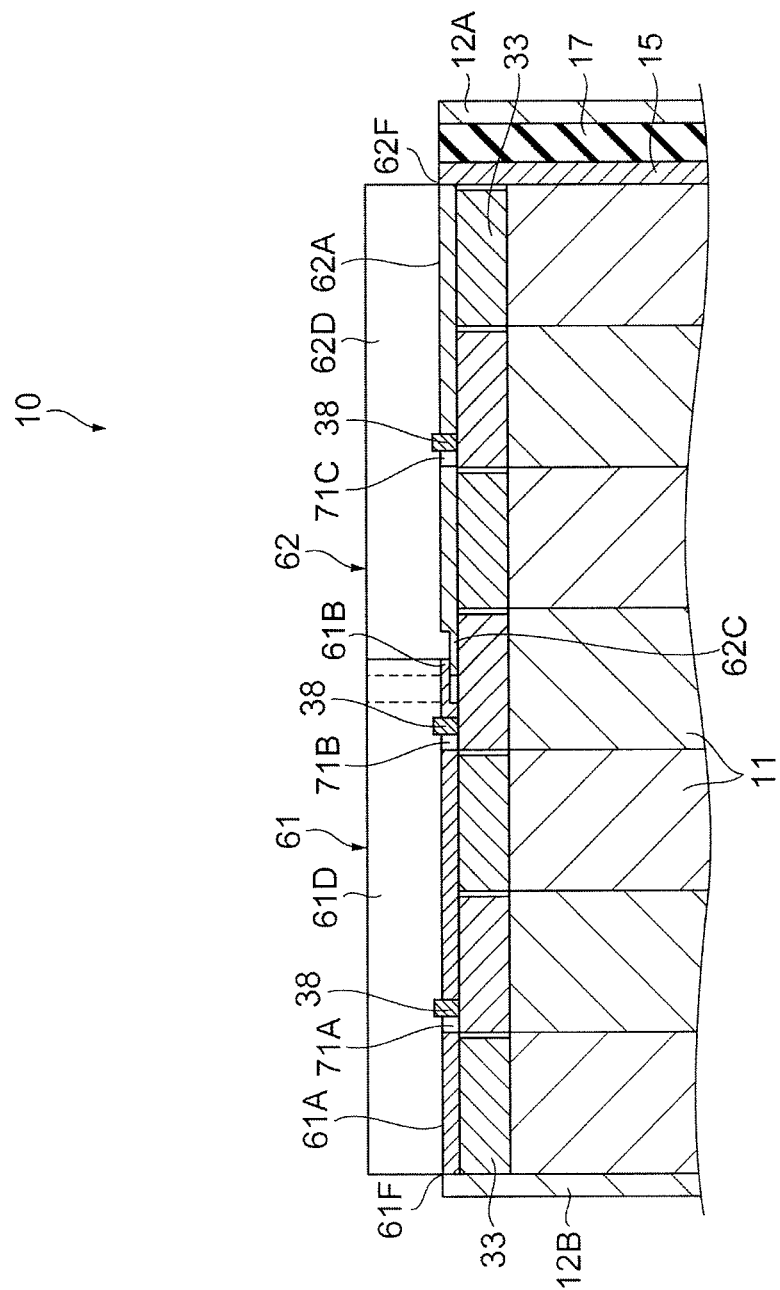
FIG. 8 is a cross-sectional view illustrating the expanded secondary cells in the structure illustrated in FIG. 2.

As illustrated in FIG. 8, the fixing portion 61F of the first cover member 61 is fixed to the end plate 12B. When the secondary cells 11 expand, the engaging protrusions 38 provided to the first cell holder 21 moves in the direction moving away from the end plate 12B (toward the right in FIG. 8). At this time, the engaging protrusions 38 move inside the respective through-holes 71A, 71B provided as long holes that extend along the direction in which the secondary cells 11 are serially arranged. The engaging protrusion 38 positioned further away from the fixing portion 61F move by a larger degree in the X-axis direction, but the through-holes 71A, 71B according to the embodiment have the lengths L based on such moving distances. Therefore, even when the secondary cells 11 expand, the movements of the engaging protrusions 38 are not restricted by the through-holes 71A, 71B.

The fixing portion 62F of the second cover member 62 is fixed to the middle plate 15. When the secondary cells 11 expand, the engaging protrusions 38 provided to the first cell holder 21 move in a direction approaching the end plate 12A (toward the right in FIG. 8). At this time, the engaging protrusions 38 move inside of the respective through-holes 71C provided as long holes extending in the direction in which the secondary cells 11 are serially arranged. The engaging protrusions 38 positioned further away from the fixing portion 62F move by a larger degree in the X-axis direction, but the through-holes 71C according to the embodiment have lengths L that are based on such moving distances. Therefore, even when the secondary cells 11 expand, the through-holes 71C do not restrict the movement of the engaging protrusions 38.

In the battery module 10 according to the embodiment described above, as illustrated in FIGS. 6 and 7, each of the through-holes 71A, 71B, 71C for passing through and to be engaged with the respective engaging protrusions 38 extends in the X-axis direction, that is, the direction in which the secondary cells 11 expand. In this manner, even when the engaging protrusions 38 on the first cell holder 21 are moved by the expansion of the secondary cells 11 in the expanding direction, because the engaging protrusions 38 can move inside of the through-holes 71A, 71B, 71C, movements in the expanding direction are not restricted. As a result, even when the secondary cells 11 expand, damages of the engaging protrusions 38 for fixing the first cover member 61 and the second cover member 62 to the first cell holder 21, or the first cover member 61 and the second cover member 62 with which the engaging protrusions 38 are engaged can be suppressed.

In the battery module 10 according to the embodiment described above, the lengths L of the first cover member 61 and the second cover member 62 in the direction in which the secondary cells 11 are serially arranged are determined based on the amount by which the engaging protrusions 38 of the first cell holder 21 move when the secondary cells 11 expand. In this manner, when the engaging protrusions 38 are moved as the secondary cells 11 expand, the degree by which the movement of the engaging protrusions 38 is restricted can be reduced more reliably.

Furthermore, the lengths L of the through-holes 71A, 71B, 71C on the first cover member 61 and the second cover member 62, extending in the direction in which the secondary cells 11 are serially arranged, are set to the minimum lengths, in a manner corresponding to the amount by which the engaging protrusions 38 of the first cell holder 21 move. In other words, the lengths L of the through-holes 71A, 71B, 71C are set to the minimum lengths based on the amount of expansion calculated in advance based on the usage temperature environment, cell characteristics, characteristics of the first cell holder 21 and the second cell holder 41. In this manner, for example, this length setting removes the limitations when various control devices are placed on the top surface of the first cover member 61 and the second cover member 62, or when the ribs for enhancing the strength are provided, for example. As a result, the battery module 10 can be designed more freely.

One embodiment of the present invention is explained above, but the present invention is not limited to the embodiment described above. Various modifications are still possible within the scope not deviating from the spirit of the present invention.

First Modification

Figure 9:
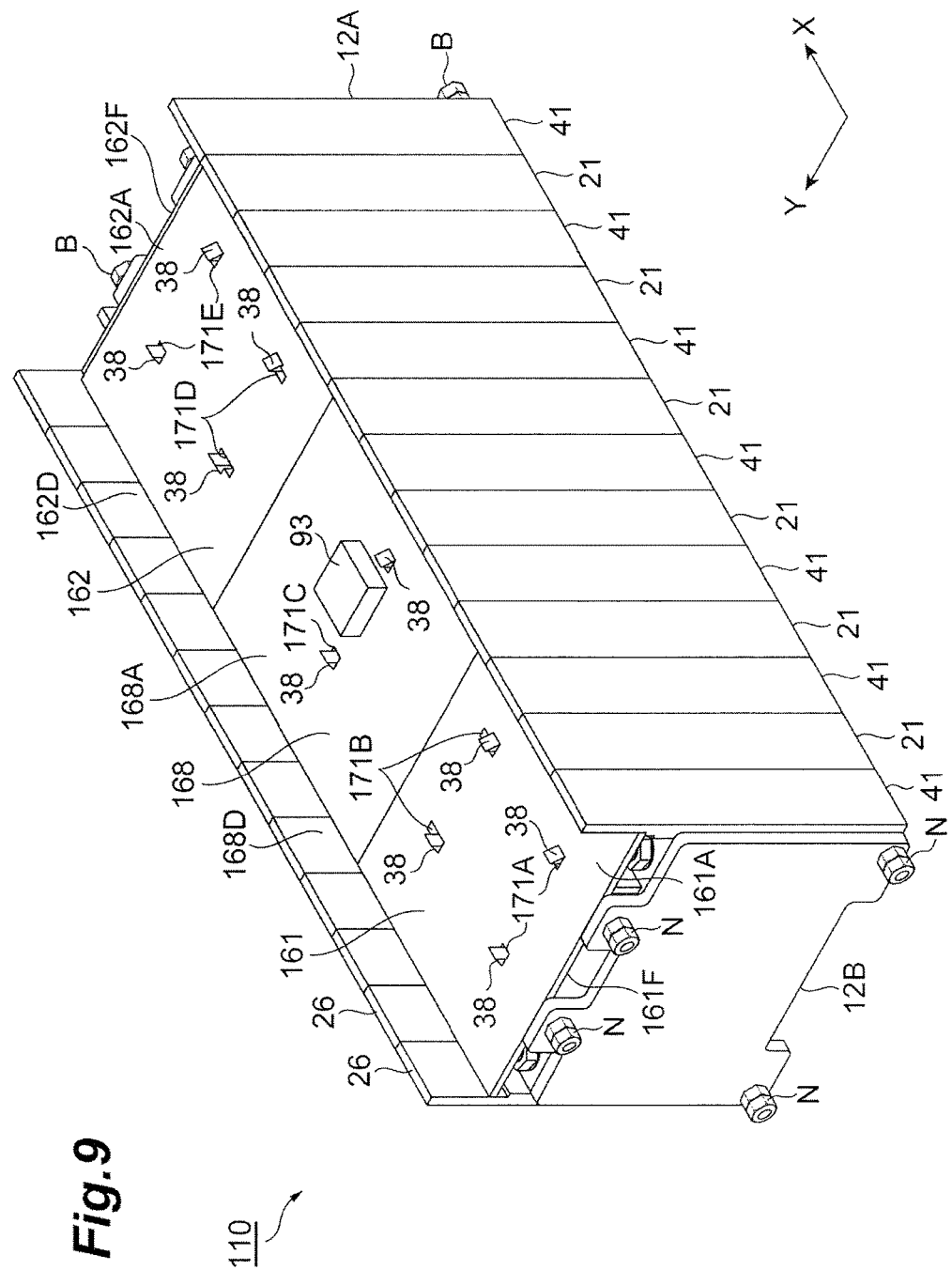
FIG. 9 is a perspective view illustrating the overall structure of a battery module according to another embodiment of the present invention.
Figure 10:
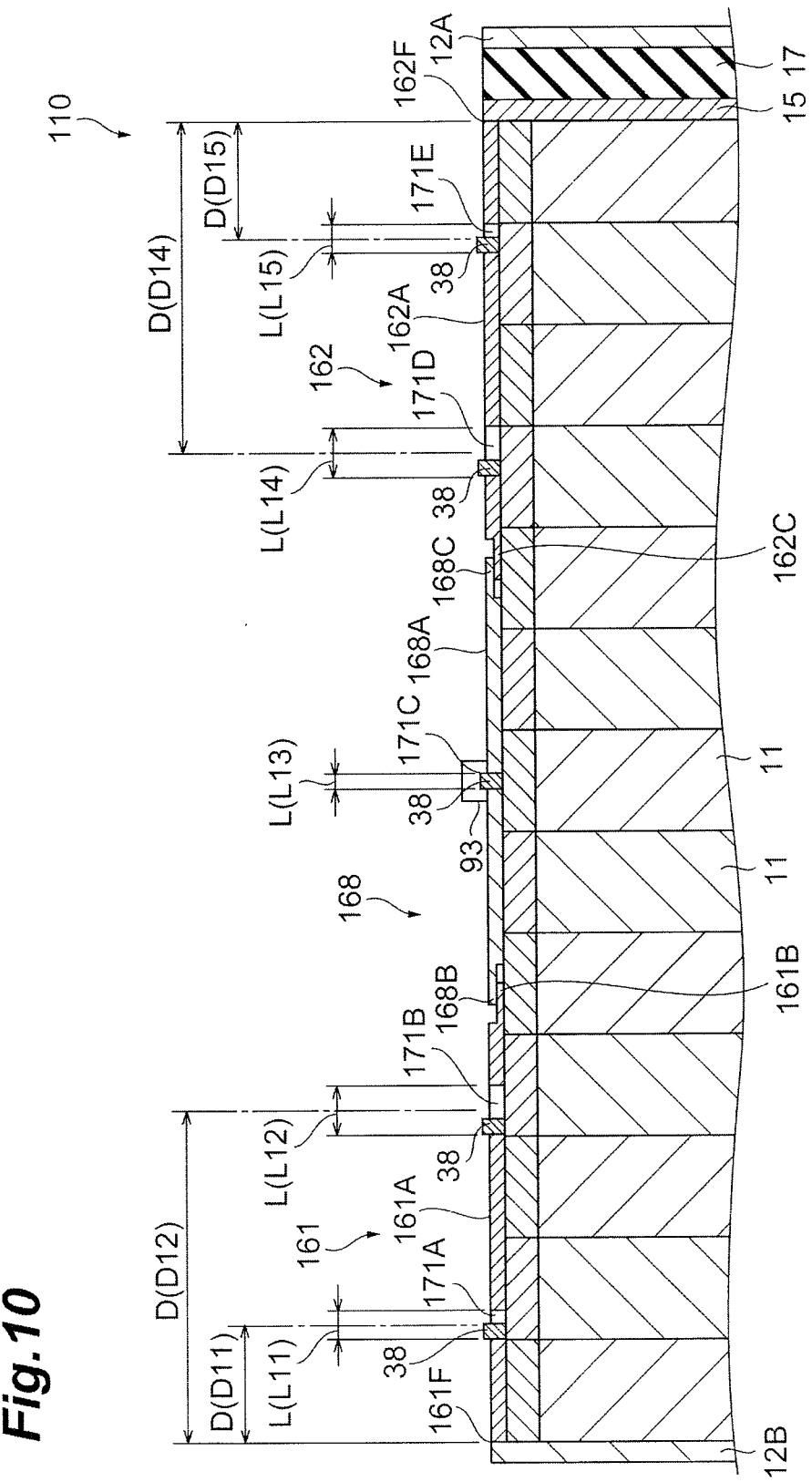
FIG. 10 is a cross-sectional view illustrating the battery module in FIG. 9 cut across the X-axis direction in a manner passing through every through-hole aligned in the X-axis direction.

The battery module 10 according to the embodiment described above may be configured to have three cover members that are serially arranged, in the direction in which the secondary cells 11 are serially arranged, as illustrated in FIGS. 9 and 10. Such a battery module according to this first modification will now be explained, as a battery module 110. The battery module 110 includes a first cover member 161, a second cover member 162, and a middle cover member 168 that are arranged in a manner facing the top surfaces of 54A of the lids 54 that are provided with the electrode terminals 55, 55 of the secondary cells 11. Explained in the first modification is an example in which the first cover member 161, the second cover member 162, and the middle cover member 168 are flat-plate shaped cover members without the standing portions and the extending portions, unlike the cover member according the embodiment. These cover members may, however, be also provided with the standing portions and the extending portions.

A main body 161A of the first cover member 161 is provided with four through-holes 171A, 171A, 171B, 171B penetrating in the thickness direction of the main body 161A (up-and-down direction). The engaging protrusions 38 on the first cell holder 21 are passed through the respective through-holes 171A, 171B provided to the main body 161A of the first cover member 161. The first cover member 161 is fixed to the first cell holder 21 by engaging the engaging portions 38A of the engaging protrusions 38 with the through-holes 171A, 171B.

The main body 162A of the second cover member 162 is provided with four through-holes 171D, 171D, 171E, 171E penetrating in the thickness direction of the main body 162A. The engaging protrusions 38 on the first cell holder 21 are passed through the respective through-holes 171D, 171E provided to the main body 162A of the second cover member 162. The second cover member 162 is fixed to the first cell holder 21 by engaging the engaging portions 38A of the engaging protrusions 38 with the respective through-holes 171D, 171E, in the same manner as in the first cover member 161.

The main body 168A of the middle cover member 168 is provided with two through-holes 171C, 171C penetrating in the thickness direction of the main body 168A. The engaging protrusions 38 on the first cell holder 21 are passed through the respective through-holes 171C provided to the main body 168A of the middle cover member 168. The middle cover member 168 is also fixed to the first cell holder 21 by engaging the engaging portions 38A of the engaging protrusions 38 with the through-holes 171C, in the same manner as in the first cover member 161.

The first cover member 161 and the middle cover member 168 have overlapping portions 161B, 168B, respectively, that overlap each other. The overlapping portion 161B of the first cover member 161 is provided on an end opposite to the part fixed to the end plate 12B. The second cover member 162 and the middle cover member 168 have overlapping portions 162C, 168C, respectively, that overlap each other. The overlapping portion 162C of the second cover member 162 is provided on an end opposite to the part fixed to the middle plate 15.

The overlapping portions 168B, 168C at the respective ends of the middle cover member 168 in the X-axis direction are placed above the overlapping portions 161B, 162C of the first cover member 161 and the second cover member 162, respectively. In other words, the middle cover member 168 is provided movably relatively to the first cover member 161 and the second cover member 162 in the X-axis direction.

Placed on the top surface of the middle cover member 168 is a control device 93 for controlling a thermistor (temperature sensor) 91 (see FIG. 4(A)) for monitoring the temperature of the secondary cells 11. In the main body 168A of the middle cover member 168, the control device 93 is interposed between the two through-holes 171C in the Y-axis direction, as illustrated in FIG. 9. The thermistor 91 is fixed to the first cell holder 21 for holding the secondary cells 11, as illustrated in FIG. 4(A).

In the battery module 110 according to the first modification, as illustrated in FIGS. 9 and 10, the lengths L of the through-holes 171A, 171B in the X-axis direction of the first cover member 161 are set in such a manner that the lengths are increased correspondingly to the distances D with respect to the one end 161F (hereinafter also referred to as a "fixing portion 161F") which is a portion at which the first cover member 161 is fixed to the other end plate 12B. In other words, the relation length L12>length L11 is established with respect to the relation distance D12>distance D11.

Similarly, the lengths L of the through-holes 171C in the X-axis direction of the second cover member 162 are set in such a manner that the lengths are increased correspondingly to the distances D with respect to one end 162F (hereinafter also referred to as a "fixing portion 162F") which is a portion fixed to the middle plate 15. In other words, length L14>length L15 is established for a relation distance D14>distance D15.

The lengths L of the through-holes 171C (L13) in the X-axis direction of the middle cover member 168 are set substantially the same as the length of the engaging protrusions 38 on the first cell holder 21 in the X-axis direction.

In the battery module 110 according to the first modification, the through-holes 171A, 171B, 171D, 171E for passing through and to be engaged with the respective engaging protrusions 38 are provided as long holes extending in the X-axis direction, that is, the direction in which the secondary cells 11 expand, in the same manner as in the battery module 10 according to the embodiment described above. Furthermore, the lengths L of the through-holes 171A, 171B, 171D, 171E in the first cover member 161 and the second cover member 162 are set correspondingly to the amount by which the engaging protrusions 38 of the first cell holder 21 move when the secondary cells 11 expand. Therefore, even when the secondary cells 11 expand, damages of the engaging protrusions 38 for fixing the first cover member 161 and the second cover member 162 to the first cell holder 21, and damages of the first cover member 161 and the second cover member 162 with which the engaging protrusions 38 are engaged can be suppressed.

The lengths L of the through-holes 171A, 171B, 171D, 171E extending in the direction in which the secondary cells 11 are serially arranged in the first cover member 161 and the second cover member 162 are set to the minimum length correspondingly to the amount by which the engaging protrusions 38 on the first cell holder 21 move. In this manner, this length setting removes the limitations when various control devices are placed on the top surface of the first cover member 161 and the second cover member 162, and when ribs for enhancing the strength are provided, for example. As a result, the battery module 110 can be designed more freely.

Furthermore, in the battery module 110 having such a structure, the middle cover member 168 is placed on the overlapping portions 161B, 162C of the respective first cover member 161 and second cover member 162, and the engaging protrusions 38 on the first cell holder 21 are passed through the through-holes 171C without any gap therebetween. In this manner, when the engaging protrusions 38 on the first cell holder 21 is moved in the expanding direction by the expansion of the secondary cells 11, the middle cover member 168 is also integrally moved. Because the middle cover member 168 is merely placed on the overlapping portions 161B, 162C of the first cover member 161 and the second cover member 162, a movement of the middle cover member 168 in the expanding direction is not prevented.

In the battery module 110 described above, the middle cover member 168 on which the control device 93 for the thermistor 91 is placed is fixed to the engaging protrusions 38 of the first cell holder 21 to which the thermistor 91 is fixed. Therefore, the relative positioning of the control device 93 with respect to the thermistor 91 does not change greatly. In other words, because the middle cover member 168 moves as the first cell holder 21 to which the thermistor 91 is fixed move, damages such as snapping of the wires for connecting the thermistor 91 and the control device 93 can be suppressed.

Explained in the first modification above is an example of the battery module 110 in which the one middle cover member is placed on the cover members that are fixed to the end plate and the middle plate, but two or more middle cover members may be provided. Furthermore, by uniformizing and standardizing the lengths of the cover members such as the first, the second, and the middle cover members in the direction in which the secondary cells 11 are serially arranged, the same parts can be used in manufacturing a plurality of types of battery modules with different capacities. In this manner, a plurality of types of battery modules can be manufactured at lower costs.

Other Modifications

Explained above are the examples of the battery module 10, 110 provided with the middle plate 15, but the present invention is not limited thereto. The battery module may be a module in which the secondary cells 11 are directly clamped between the end plates 12, 12.

Explained for the battery module 10 according to the embodiment described above is an example in which the lengths L of the through-holes 71A, 71B, 71C provided to the first cover member 61 and the second cover member 62 in the X-axis direction are determined correspondingly to the distances with respect to the fixing position 61F, 62F that are to be fixed with the other end plate 12B or the middle plate 15, but the present invention is not limited thereto. For example, the through-holes 71A, 71B, 71C may be through-holes extending uniformly in the X-axis direction, that is, extending in the direction in which the secondary cells 11 are serially arranged, regardless of the distances with respect to the fixing position 61F, 62F that are to be fixed to the other end plate 12B or the middle plate 15.

Furthermore, explained for the battery module 10 according to the embodiment described above is an example in which two cover members (the first cover member 61 and the second cover member 62) are serially arranged in the direction in which the secondary cells 11 are serially arranged, but the present invention is not limited thereto. For example, the battery module 10 may be provided with one cover member. In such a configuration, the cover member is fixed to one of the pair of end plates 12A, 12B or to the middle plate 15. The through-holes provided to the main body of the cover member may be all provided as long holes extending in the direction in which the secondary cells 11 are serially arranged, or may have lengths corresponding to the distances with respect to the portion to be fixed to the pair of end plates 12A, 12B or the middle plate 15 (the length may be increased when the hole is positioned further away from the fixing portion).

Explained in the embodiment described above is an example in which only the first cell holder 21 is provided with the engaging protrusions, but the engaging protrusions 38 may be provided to both of the first cell holder 21 and the second cell holder 41. In other words, only the first cell holder 21 may be used. In such a configuration, the number of the through-holes 71A, 71B, 71C provided to the first cover member 61 and the second cover member 62 may be changed based on the number of the engaging protrusions 38 on the first cell holder 21 and the second cell holder 41.

Explained in the embodiment described above is an example in which the engaging protrusions 38 are provided to both of the two pillar members 33 provided to the first cell holder 21, but the engaging protrusion 38 may be provided only to one of the pillar members 33. Furthermore, explained in the embodiment described above is an example in which the engaging protrusions 38 are provided to the pillar members 33 on the first cell holder 21, but the engaging protrusions 38 may be provided to any other positions.

Explained in the embodiment described above is an example in which one cell holder holds one secondary cell 11, but one cell holder may hold a plurality of secondary cells 11.

REFERENCE SIGNS LIST 10, 110 . . . battery module (power storage module), 11 . . . secondary cell (power storage device), 12 (12A, 12B) . . . end plate (clamping portion), 15 . . . middle plate (middle clamping portion), 17 . . . rubber member (elastic body), 21 . . . first cell holder (holding member), 38 . . . engaging protrusions (fixing portion), 38A . . . engaging portion, 41 . . . second cell holder (holding member), 54A . . . top surface of the lid, 61, 161 . . . first cover member, 62, 162 . . . second cover member, 71A to 71C, 171A to 171E . . . through-hole (hole), 91 . . . thermistor (temperature sensor), 93 . . . control device, 168 . . . middle cover member

What is claimed is:

1. A power storage module in which a plurality of power storage devices, each including an electrode assembly having a positive electrode and a negative electrode and housed in an enclosure, are serially arranged in one direction, with holding members holding the respective power storage devices, the power storage module comprising:
   a pair of clamping portions configured to clamp the power storage devices that are serially arranged in the one direction, the pair of clamping portions being disposed at opposite ends of the power storage module in the one direction;
   a cover member fixed to one of the pair of clamping portions and extending across the plurality of power storage devices in the one direction so as to face a top surface of a lid that closes the enclosure, the top surface of the lid including electrode terminals;
   a long hole extending through the cover member toward the top surface of the lid in a direction orthogonal to the one direction; and
   a fixing portion protruding from the holding member and passing through the long hole so as to be engaged with the cover member, wherein
   the long hole has a length longer than a size of the fixing portion in the one direction in which the power storage devices are serially arranged.

2. The power storage module according to claim 1, wherein
   an elastic body is disposed at least one of between the adjacent power storage devices, and between the power storage device and one of the clamping portions.

3. The power storage module according to claim 2, further comprising
   a middle clamping portion disposed between the pair of clamping portions, and disposed on the one of the clamping portions via the elastic body, wherein the other clamping portion and the middle clamping portion are disposed at respective both ends of the power storage devices that are serially arranged in the one direction.

4. The power storage module according to claim 3, wherein
   the length of the long hole in the one direction is set correspondingly to at least one of a distance from a portion at which the cover member and the clamping portion are fixed and to a distance from a portion at which the cover member and the middle clamping portion are fixed.

5. A power storage module in which a plurality of power storage devices, each including an electrode assembly having a positive electrode and a negative electrode and housed in an enclosure, are serially arranged in one direction, with holding members holding the respective power storage devices, the power storage module comprising:
   a pair of clamping portions configured to clamp the power storage devices that are serially arranged in the one direction;
   a cover member fixed to one of the pair of clamping portions, and to be positioned in a manner facing a surface provided with electrode terminals in the enclosure;
   a long hole provided to the cover member, and extending in the one direction; and
   a fixing portion provided to the holding member, protruding in a direction from which the cover member is placed, and to be engaged with the cover member, with the fixing portion passed through the hole, wherein
   the long hole extends in the direction in which the power storage devices are serially arranged, and has a length longer than a size of the fixing portion in a direction in which the power storage devices are serially arranged,
   the cover member includes a first cover member and a second cover member, and
   the first cover member is fixed to one of the clamping portions, and the second cover member is fixed to the other clamping portion.

6. The power storage module according to claim 5, wherein
   the cover member further includes a middle cover member disposed between the first cover member and the second cover member in the one direction, and placed in a manner facing a surface of each of the enclosures of the power storage devices, the surface being provided with the electrode terminals, and
   the middle cover member is provided movably relatively to the first cover member and the second cover member disposed adjacently to the middle cover member.

7. The power storage module according to claim 5, wherein
   the cover member further includes a plurality of middle cover members that are disposed between the first cover member and the second cover member in the one direction, and are placed in a manner facing a surface of each of the enclosures of the power storage devices, the surface being provided with the electrode terminals, and
   one of the middle cover members is provided movably relatively to one of the first cover member, the second cover member, and other middle cover members adjacently positioned to the one middle cover member.

8. The power storage module according to claim 7, wherein
- a temperature sensor is provided to the holding member to which the middle cover member is fixed via the fixing portion, and
- the holding member provided with the temperature sensor and the middle cover member are integrally movably fixed.

9. The power storage module according to claim 5, wherein
- one end of each of the first cover member and the second cover member, the one end being an end in the one direction, is provided with an overlapping portion enabling the cover members that are adjacent to each other to be disposed in a manner overlapped with each other.

10. The power storage module according to claim 6, wherein
- each of the first cover member, the second cover member, and the middle cover member is provided with an overlapping portion on at least one end in the one direction, the overlapping portion enabling the cover members adjacent to each other to be placed in a manner overlapping each other.

11. The power storage module according to claim 7, wherein each of the first cover member, the second cover member, and the middle cover members is provided with an overlapping portion on at least one end in the one direction, the overlapping portion enabling the cover members adjacent to each other to be placed in a manner overlapping each other.

* * * * *